United States Patent
McAlpine (10) Patent No.: US 10,030,374 B2
(45) Date of Patent: Jul. 24, 2018

(54) DRAINAGE FITTING (71) Applicant: McAlpine & Co. Ltd., Glasgow, Strathcylde (GB)

(72) Inventor: James Edward McAlpine, Glasgow (GB)

(73) Assignee: McApline & Co. Ltd. (GB)

( * ) Notice: Subject to any disclaimer, the term of this patent is extended or adjusted under 35 U.S.C. 154(b) by 178 days.

(21) Appl. No.: 14/892,806

(22) PCT Filed: May 21, 2014

(86) PCT No.: PCT/GB2014/051554
§ 371 (c)(1),
(2) Date: Nov. 20, 2015

(87) PCT Pub. No.: WO2014/188185
PCT Pub. Date: Nov. 27, 2014

(65) Prior Publication Data
US 2016/0090722 A1    Mar. 31, 2016

(30) Foreign Application Priority Data
May 22, 2013 (GB) .................................. 1309185.5

(51) Int. Cl.
*E03C 1/298* (2006.01)
*E03F 5/08* (2006.01)
(Continued)

(52) U.S. Cl.
CPC ............ *E03C 1/298* (2013.01); *E03C 1/281* (2013.01); *E03F 5/08* (2013.01); *F16K 15/147* (2013.01)

(58) Field of Classification Search
CPC .. E03C 1/281; E03C 1/298; E03F 5/08; F16K 15/147
(Continued)

(56) References Cited

U.S. PATENT DOCUMENTS

| 803,979 | A | * | 11/1905 | Bonnell | ................. B01D 61/08 137/247.15 |
| 3,107,687 | A | * | 10/1963 | Howe | ..................... E03F 5/042 137/327 |

(Continued)

FOREIGN PATENT DOCUMENTS

| CA | 2828793 A1 * | 9/2012 | ............. E03C 1/298 |
| DE | 20320636 U1 | 11/2004 | |

(Continued)

OTHER PUBLICATIONS

International Preliminary Report and Written Opinion to corresponding international patent application No. PCT/GB2014/051554, dated Nov. 24, 2015, 8 pages.
(Continued)

*Primary Examiner* — Michael R Reid
*Assistant Examiner* — Jonathan Waddy
(74) *Attorney, Agent, or Firm* — Tarolli, Sundheim, Covell & Tummino LLP (57) ABSTRACT

A drainage fitting (10) is described. The drainage fitting (10) comprises a housing (12) adapted to be inserted into a drainage outlet, the housing defining a housing inlet (14) and a housing outlet (16) and a one way valve (18) adapted to be received within the housing (12). The one way valve (18) has a body defining a valve inlet (22), a valve outlet (24) and a valve passageway (26), the passageway (26) providing fluid communication between the housing inlet (14) and the housing outlet (16). The drainage fitting (10) further comprises a fitting insert (28) adapted to be located in the housing inlet (14), the fitting insert (28) defining an insert portion (30) adapted to extend through the valve inlet (22) and into the valve passageway (26). In the presence of a negative pressure differential, air can pass through the valve (18) to relieve the pressure differential, but in the event of a positive pressure differential, the insert portion (30) prevents
(Continued)

the one way valve from inverting to relieve the pressure differential.

21 Claims, 5 Drawing Sheets

(51) Int. Cl.
*F16K 15/14* (2006.01)
*E03C 1/28* (2006.01)

(58) Field of Classification Search
USPC .... 137/362; 4/287, 387, 426, 679, 681, 682, 4/688, 695, 696
See application file for complete search history.

(56) References Cited

U.S. PATENT DOCUMENTS

| | | | | |
|---|---|---|---|---|
| 4,318,547 A * | 3/1982 | Ericson | ............. | F16L 25/14 277/607 |
| 4,440,406 A * | 4/1984 | Ericson | ............. | E03F 3/04 277/607 |
| 4,870,992 A * | 10/1989 | Irwin | ............. | E03C 1/298 137/362 |
| 5,005,603 A * | 4/1991 | Amundson | ............. | E03F 5/042 137/192 |
| 5,441,679 A * | 8/1995 | Chalich | ............. | B29C 45/1676 264/250 |
| 6,044,859 A * | 4/2000 | Davis | ............. | A61M 39/24 137/15.19 |
| 6,527,011 B1 * | 3/2003 | Mantz | ............. | A61M 16/208 128/203.11 |
| 6,585,005 B1 * | 7/2003 | Raftis | ............. | F16K 15/147 137/846 |
| 6,626,201 B1 * | 9/2003 | Kim | ............. | E03F 5/042 137/1 |
| 9,010,363 B2 * | 4/2015 | Huber | ............. | E03F 5/0407 137/512.1 |
| 9,416,986 B2 * | 8/2016 | Huber | ............. | F24F 7/02 |
| 2005/0257315 A1 * | 11/2005 | Hung | ............. | A47K 1/14 4/295 |
| 2006/0101565 A1 * | 5/2006 | Cummings | ............. | E03C 1/28 4/309 |
| 2010/0192295 A1 * | 8/2010 | Fima | ............. | E03D 13/00 4/679 |
| 2010/0205725 A1 * | 8/2010 | McAlpine | ............. | E03C 1/264 4/144.1 |
| 2011/0010833 A1 * | 1/2011 | Fima | ............. | C02F 1/325 4/301 |
| 2011/0203048 A1 * | 8/2011 | Fima | ............. | E03C 1/281 4/679 |
| 2011/0277229 A1 * | 11/2011 | Connor | ............. | E03F 5/0407 4/293 |
| 2012/0047646 A1 * | 3/2012 | Park | ............. | E03C 1/292 4/688 |
| 2012/0192950 A1 * | 8/2012 | Huber | ............. | E03C 1/298 137/1 |
| 2014/0130899 A1 * | 5/2014 | McAlpine | ............. | E03C 1/298 137/315.11 |
| 2014/0373931 A1 * | 12/2014 | Huber | ............. | E03F 5/042 137/15.08 |
| 2015/0300511 A1 * | 10/2015 | Fima | ............. | F16K 15/148 137/512 |
| 2017/0121953 A1 * | 5/2017 | Benesh | ............. | E03C 1/298 |
| 2017/0122445 A1 * | 5/2017 | Fima | ............. | F16K 15/148 |

FOREIGN PATENT DOCUMENTS

| | | |
|---|---|---|
| DE | 202009018443 U1 | 9/2011 |
| DE | 202011050359 U1 | 10/2011 |
| KR | 101166553 B1 | 7/2012 |
| WO | 2009001115 A1 | 12/2008 |

OTHER PUBLICATIONS

International Search Report corresponding to PCT/GB2014/051554, dated Aug. 20, 2008, 3 pages.

* cited by examiner

DRAINAGE FITTING

CROSS-REFERENCE TO RELATED APPLICATIONS

This application is the U.S. national phase entry of PCT/GB2014/051554, with an international filing date of May 21, 2014, which claims priority to and the benefit of GB 1309185.5, filed on May 22, 2013, the contents of which are hereby incorporated by reference in their entirety.

FIELD OF THE INVENTION

The present invention relates to a drainage fitting for sealing a drain.

BACKGROUND TO THE INVENTION

Floor drains are used across the world to allow quick and easy removal of waste water and debris from tiled or hard surfaced flooring after washing. They are commonly used in showers and in factories where sanitation is extremely important. Floor drains are connected by a pipe to a soil stack or similar sewer.

A positive pressure differential normally exists between the sewer and the surrounding environment, that is the pressure is higher in the sewer than it is in the surrounding environment. Such a situation allows for a flow of air and associated odours from the sewer into the environment surrounding the floor drain and inlet.

It is preferable to provide some form of trap between the floor drain inlet and the soil stack or sewer to prevent the ingress of these odours and also to prevent the ingress of creatures from the sewer into the environment surrounding the floor drain and inlet.

Where a trap is provided, the style of trap typically used is a liquid trap. However, liquid traps can get blocked quite easily if larger objects are brushed into the drain. Floor drains generally have no form of flushing system and are reliant on buckets of water to keep them clean and in the event of blockage, and often require rodding. Additionally, liquid traps, especially in hot countries, can evaporate allowing the ingress of rodents and odours from the sewers into the environment surrounding the drain opening.

Furthermore, in many countries, drainage systems are not vented, and a negative pressure differential can exist, that is the pressure within the sewer is lower than the environmental pressure which applies a downstream pulling force to the liquid trap, with the result that liquid traps can be sucked downstream, removing the trap and exposing the environment to downhole odours and rodents.

Floor drains without traps do not block as easily but have little resistance to odours and rodents from the sewer below, the only protection for the surrounding environment being the provision of a cover, such as a grating.

SUMMARY OF THE INVENTION

According to a first aspect of the present invention there is provided a drainage fitting, the drainage fitting comprising:

a housing adapted to be inserted into a drainage outlet, the housing defining a housing inlet and a housing outlet;

a one way valve adapted to be received within the housing, the one way valve having a body defining a valve inlet, a valve outlet and a valve passageway, the passageway providing fluid communication between the housing inlet and the housing outlet; and a fitting insert adapted to be located in the housing inlet, the fitting insert defining an insert portion adapted to extend through the valve inlet and into the valve passageway;

wherein in the presence of a negative pressure differential air can pass through the valve to relieve the pressure differential, but in the event of a positive pressure differential, the insert portion prevents the one way valve from inverting to relieve the pressure differential.

In the context of this application, a negative pressure differential exists when the pressure in the sewer is less than the environmental pressure and a positive pressure differential exists when the pressure in the sewer is greater than the environmental pressure. The environmental pressure, in the context of this application is the pressure of the atmosphere at the drainage outlet.

It has been found that the presence of the insert portion prevents the one way valve from inverting even under the influence of a significant force applied by a positive pressure differential. Surprisingly, it has been found by utilising an insert of this type, simple rubber duck bill valves can be used to provide the one way valve, the duck bill valve providing a cheap and effective barrier.

In at least one aspect of the present invention, a drainage fitting is provided which has the provision of a one way valve to allow the flow of liquids and objects from the environment surrounding the drainage fitting inlet into the sewer below. The one way valve additionally allows air to be sucked into the sewage system in the event of negative pressure in the sewage system. The presence of the one way valve prevents, or at least reduces, odours coming from the sewer through the inlet and provides a barrier for preventing the influx of creatures from the sewer.

The housing may have an upper surface, a side wall and an end surface.

The upper surface may define the housing inlet, the lower surface may define the housing outlet and the side wall may define a housing throughbore.

The housing may be cylindrical.

The drainage fitting may further comprise a seal for sealing the housing into a drainage outlet.

In one embodiment, the housing side wall defines an external surface adapted to receive the seal.

The seal may be adapted to be releaseably attachable to a housing external surface.

The seal may be received within the housing.

The housing upper surface may define a recess adapted to receive the seal. Such an arrangement permits the seal to be engaged with the housing such that if a pull force is applied to the housing, the seal and the housing remain together.

The seal may form an interference fit with the housing.

Particularly, an internal seal surface may form an interference fit with a housing side wall external surface.

The seal may be elastomeric.

The seal may define external ribs adapted to engage a drain internal surface.

The fitting insert may be locatable in the housing inlet.

The fitting insert may be releaseably locatable in the housing inlet.

The fitting insert may be releaseably locatable by means of a push fit, twist fit, screw fit or threadable connection.

Particularly, the fitting insert may be locatable in the housing inlet by means of a bayonet fitting.

The fitting insert may define an upper surface.

Once located within the housing inlet, the fitting insert upper surface may be co-planar with the housing upper surface.

The draining fitting may further comprise a drain cover.

One or other or both of the fitting insert upper surface and/or the housing upper surface may define lugs adapted to support the drain cover.

The fitting insert may be adapted to sandwich the one way valve with the housing.

The fitting insert may define a filter.

The filter may be a coarse filter.

The filter may extend across the fitting insert inlet.

The filter may define a grill.

The insert portion may downwardly depend from the grill. Such an arrangement reduces the visual impact of the insert portion.

The fitting insert may define a valve engaging surface.

The fitting insert valve engaging surface may extend down into the valve.

The fitting insert valve engaging surface may be vertically located in use. Such an arrangement may permit the valve to be lifted out of the housing by means of the fitting insert.

BRIEF DESCRIPTION OF THE DRAWINGS

An embodiment of the present invention will now be described with reference to the accompanying drawings in which.

DETAILED DESCRIPTION OF THE DRAWINGS

Figure 1:
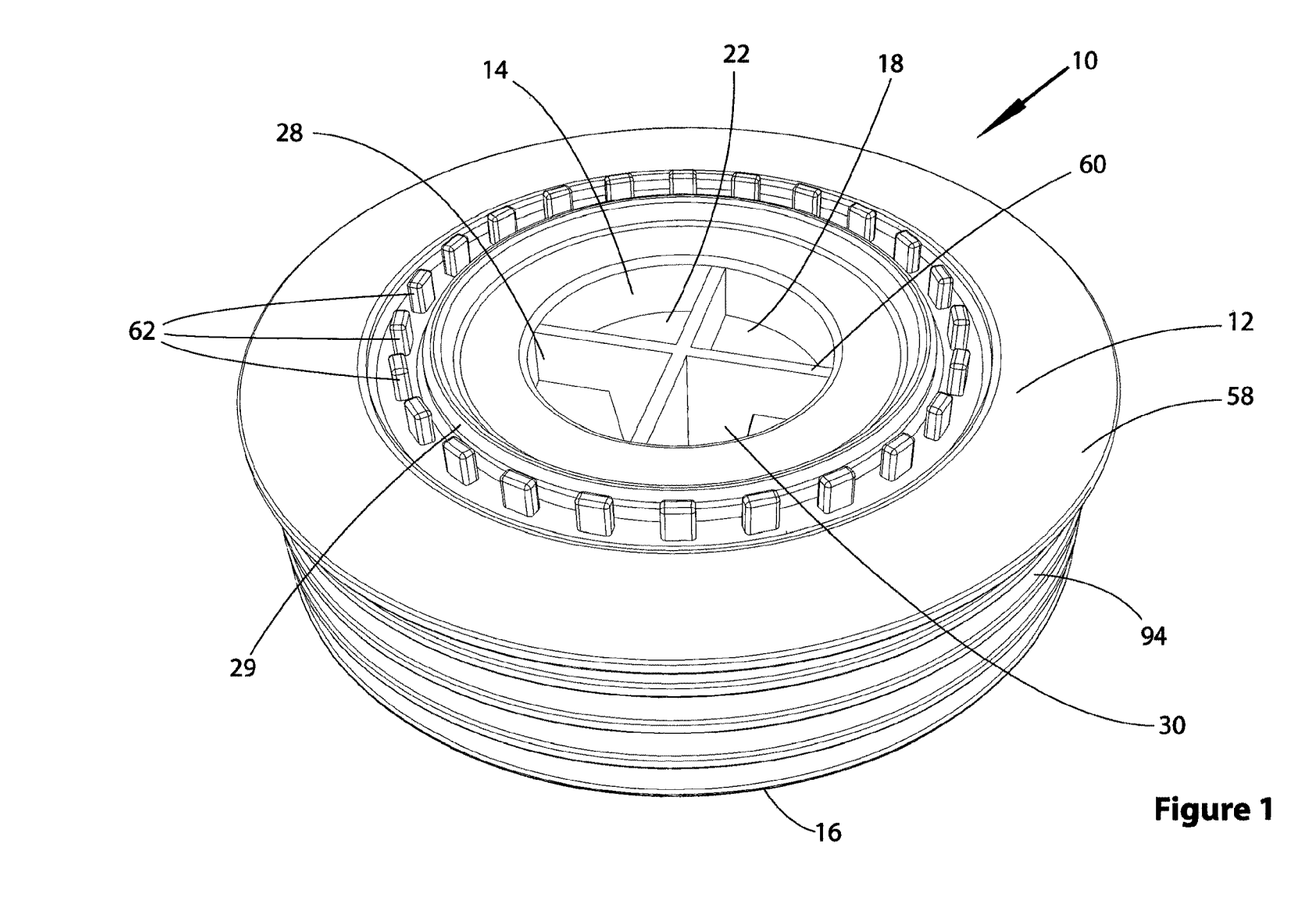
FIG. 1 is a perspective view of a drainage fitting according to an embodiment of the present invention.
Figure 2:
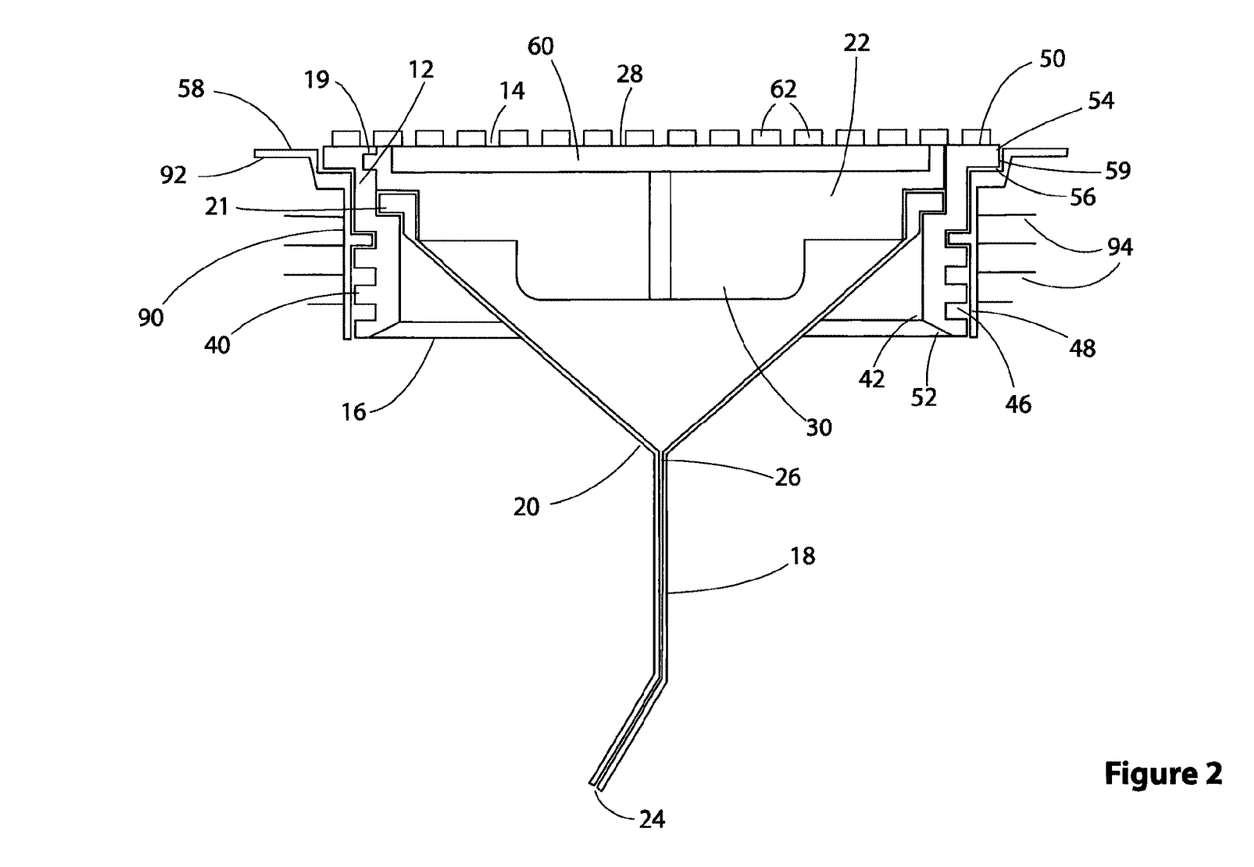
FIG. 2 is a section view through the drainage fitting of FIG. 1.

Reference is first made to FIGS. 1 and 2, perspective and section views of a drainage fitting, generally indicated by reference numeral 10, according to an embodiment of the present invention.

Figure 3:
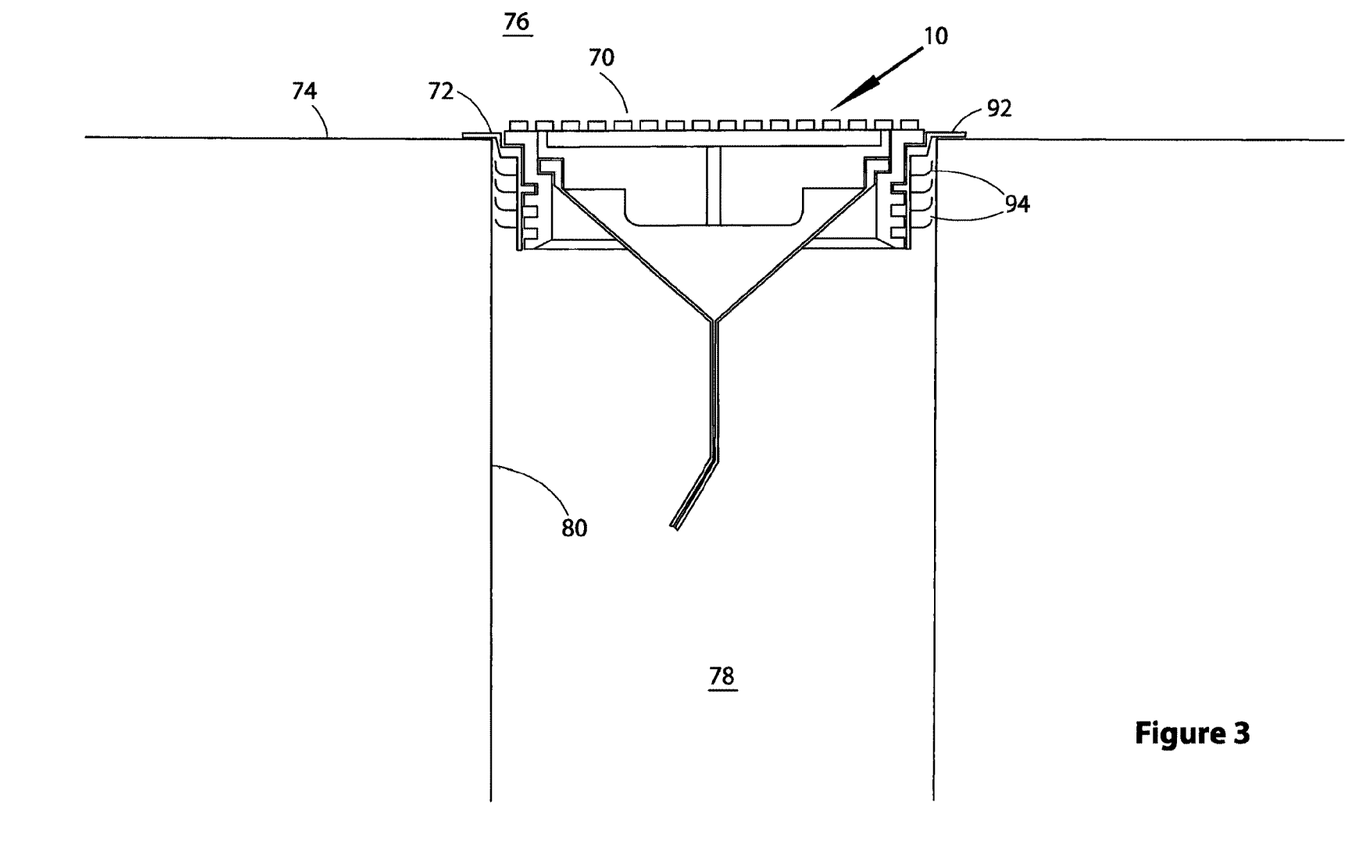
FIG. 3 is a section view through the drainage fitting of FIG. 1 shown in situ in a drainage outlet.
Figure 4:
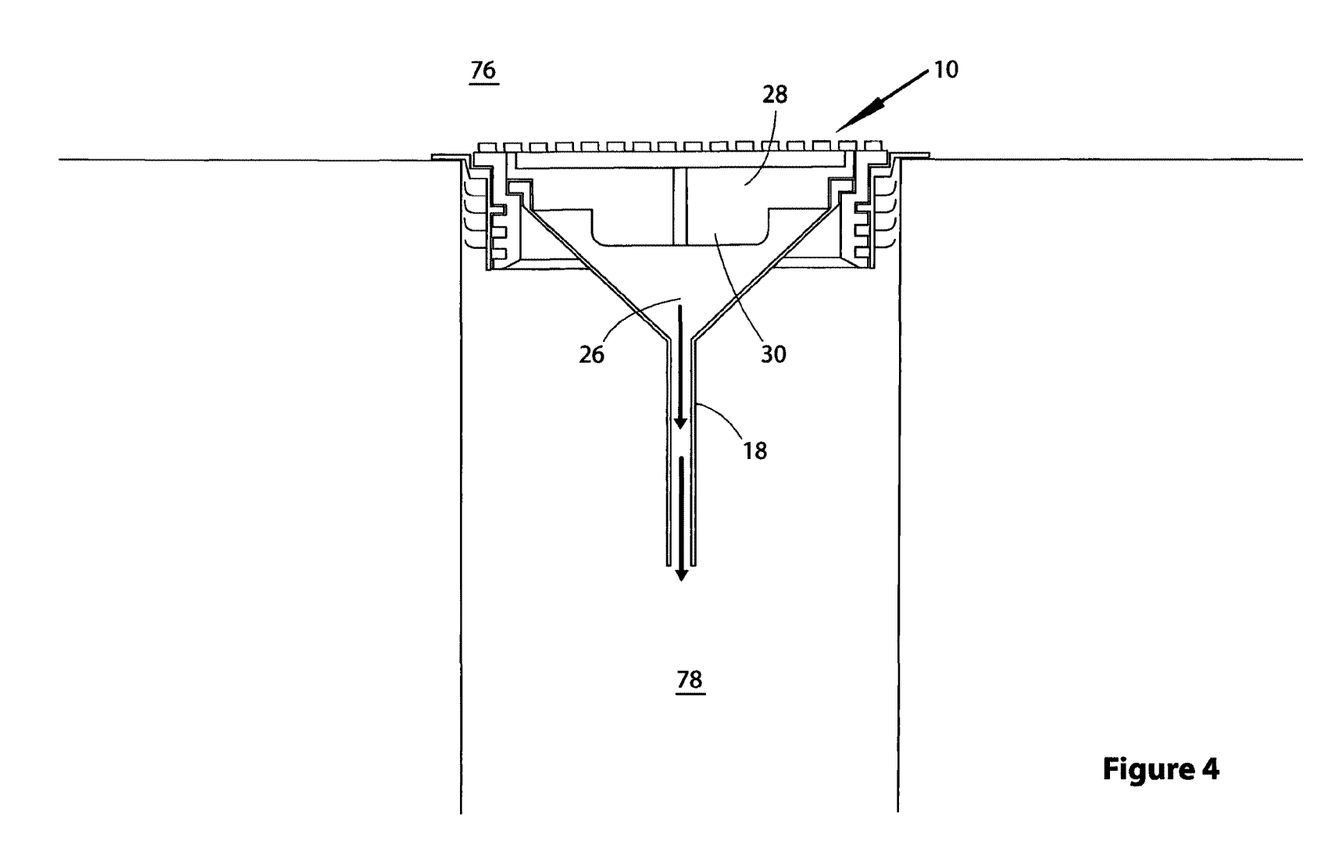
FIG. 4 is a section view of the drainage fitting of FIG. 1 shown in the drainage outlet of FIG. 3 relieving pressure in a negative pressure differential situation.
Figure 5:
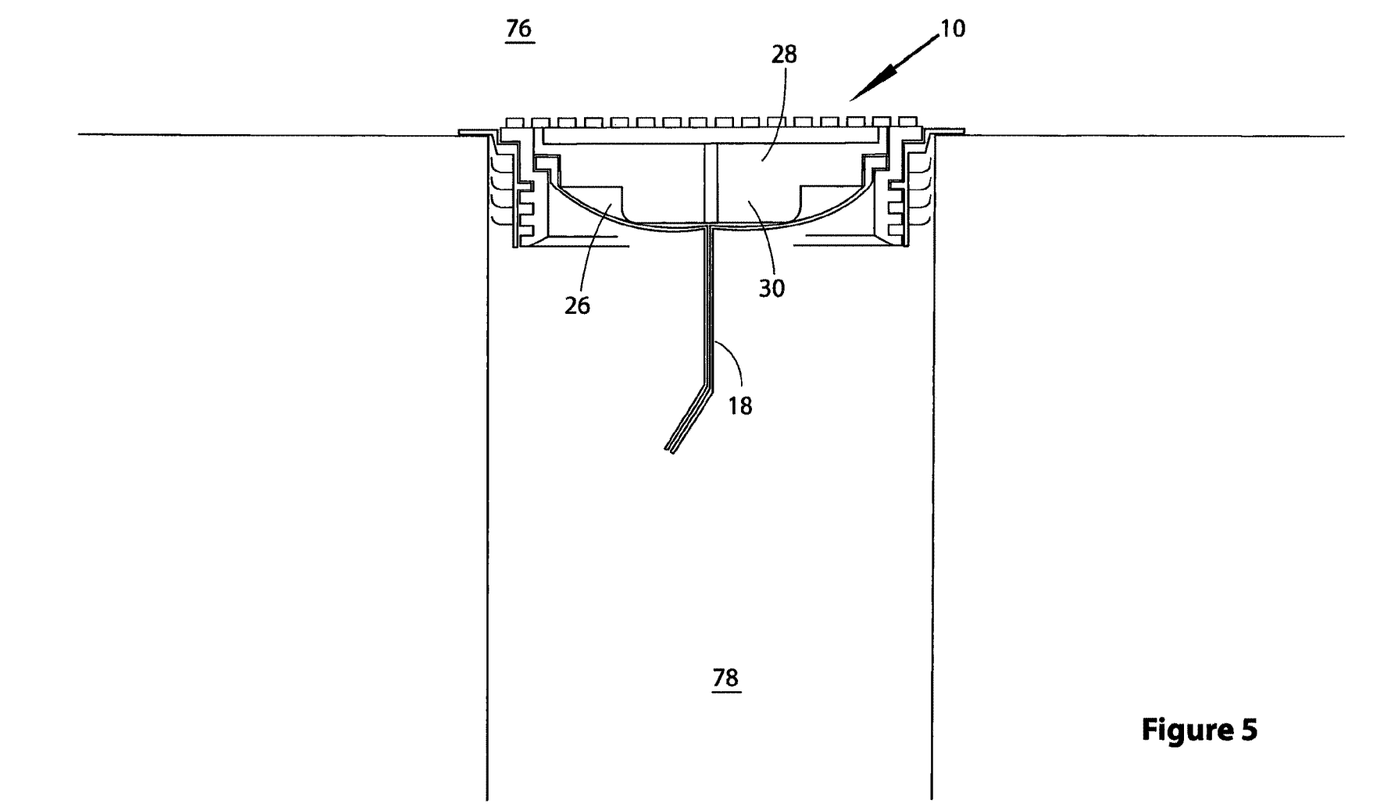
FIG. 5 is a section view of the drainage fitting of FIG. 1 shown in the drainage outlet of FIG. 3 shown resisting a positive differential.

The drainage fitting 10 comprises a housing 12 adapted to be inserted into a drainage outlet (shown and discussed in due course in connection with FIGS. 3 to 5). The housing 12 defines a housing inlet 14 and a housing outlet 16. The drainage fitting 10 further comprises a one way valve 18 adapted to be received within the housing 12, the one way valve 18 having a body 20 defining a valve inlet 22, a valve outlet 24 and a valve passageway 26.

The drainage fitting 10 further comprises a fitting insert 28 positioned within the housing inlet 14 and positively secured to the housing 12 by a bayonet connection 19. Once secured, a one way valve flange 21 is trapped between the fitting insert 28 and the housing 12, securing the one way valve 18 in the drainage fitting 10.

The housing 12 is cylindrical, having a wall 40 with an internal surface 42 and an external surface 46 for receiving and engaging with a drainage fitting seal 48. The housing wall 40 further defines an upper surface 50 and a lower surface 52, the upper surface 50 defining the housing inlet 14 and the lower surface 52 defining the housing outlet 16.

The housing 12 further defines a radially extending lip 54, the lip 54 defining a profile 59 which is complementary to a seal recess 56. When the drainage fitting 10 is assembled, the housing upper surface 50, the seal upper surface 58 and a fitting insert upper surface 29 are substantially coplanar.

The housing upper surface 50 further defines a plurality of castellations 62 adapted to support a portion of a drain cover (not shown). A drain cover can be provided to provide an aesthetic appearance to the floor drain.

Extending radially from a seal wall 90 are a seal lip 92 and four parallel seal fins 94. The purpose of the seal lip 92 and the fins 94 will be discussed in due course.

The one way valve 18 is a rubber duck bill valve. This is an effective device for allowing the flow of fluids through the drainage fitting 10 into a sewer (not shown). Valves 18 of this sort are robust and reliable but are prone to inversion in the presence of a pressure differential acting against the normal flow of fluid through the valve 18.

This deficiency is remedied by the fitting insert 28. The fitting insert 28 sits within the housing inlet 14 and defines a grill 60 to prevent large objects from entering into the one way valve 18. The fitting insert 28 defines a downwardly depending insert portion 30 adapted to extend from the grill 60, through the valve inlet 22 and into the centre of the valve passageway 26.

Reference is now made to FIGS. 3, 4 and 5. FIG. 3 is a section view through the drainage fitting 10 of FIG. 1 shown in situ in a drainage outlet 70, FIG. 4 is a section view of the drainage fitting 10 shown relieving pressure in a negative pressure differential situation and FIG. 5 is a section view of the drainage fitting 10 shown resisting a positive differential.

The drainage outlet 70 is an opening 72 defined by a floor 74. The drainage outlet 70 provides a route to remove waste water, for example, from a shower room 76 to a sewer 78. In many countries, these outlets 70 are covered by a simple grill which provides an ineffective barrier to odours and rodents wishing to enter the shower room 76 from the sewer 78. The problem can be particularly exacerbated if the drainage outlet 70 does not include water barrier, for example between the shower room 76 and the sewer 78.

Installation of the drainage fitting 10 is achieved by simply pressing the fitting 10 into the drainage outlet 70. The seal lip 92 is pressed into contact with the floor 74 and, as can be seen, the fins 94 deform to form a contact seal with an outlet wall 80. The combination of the seal lip 92 and the fins 94 provide an effective five point of contact seal between the outlet fitting 10 and the drainage outlet 70.

As the fitting insert 28 is attached to the fitting housing 14 by means of a bayonet connection 19, removal of the fitting insert 28 and consequently the one-way valve 18 can be achieved from above, without needing to remove the drainage fitting 10 from the drainage outlet 70. Such an arrangement facilitates cleaning of the fitting 10 and replacement of the one-way valve 18.

Referring to FIG. 4, the drainage fitting 10 is constructed such that in the presence of a negative pressure differential, that is pressure below the drainage fitting 10 (that is in the sewer 78) is lower than pressure above the drainage fitting 10 (that is in the shower room 76), air can pass through the one way valve passageway 26 to relieve the pressure differential and equalise the pressure across the drainage fitting 10. In this situation, there is no contact between the downwardly depending portion 30 of the fitting insert and the one way valve 18.

However, referring to FIG. 5, there is a positive pressure differential, that is the pressure below the drainage fitting 10 (that is in the sewer 78) is greater than pressure above the drainage fitting 10 (that is in the shower room 76), the insert portion 30 which extends into the valve passageway 26 prevents the one way valve 18 from inverting. This prevents the pressure being relieved and prevents odours being omitted from below the housing outlet into the environment above the housing inlet.

Various modifications and improvements may be made to the above described embodiment without departing from the scope of the present invention. For example although the drainage fitting described is a floor drain, the principle of using the downwardly depending portion to prevent inversion of a one way valve may be used in other drainage fittings such as in sinks or tubs.

The invention claimed is:

1. A floor drain fitting, the floor drain fitting being configured to be press fitted into a drainage outlet, wherein the floor drain fitting comprises:
    a housing comprising an upper surface defining a housing inlet, a lower surface defining a housing outlet and a sidewall defining a housing throughbore, wherein the sidewall includes an external surface profile and a radially extending lip extending from the upper surface, wherein the external surface profile is configured to receive and engage with a complementary internal surface profile of a seal, wherein an assembly of the housing and the seal is configured to be inserted by a press-fit as a unit into the drainage outlet;
    wherein the seal includes a body and an upper surface, wherein an inner surface of the body includes the internal surface profile and an outer surface of the body includes a plurality of radially extending fins, wherein the upper surface of the seal comprises a recess and a radially extending seal lip, wherein the radially extending seal lip of the housing is received and engaged in the recess and wherein, in use, the seal radially extending lip engages with a floor adjacent to the drainage outlet and the radially extending fins engage with an inner surface of the drainage outlet;
    a one-way valve configured to be received within the housing, the one-way valve being operable to allow fluid communication between the housing inlet and the housing outlet and preventing fluid communication between the housing outlet and the housing inlet in a direction from the housing outlet to the housing inlet.

2. A floor drain fitting, the floor drain fitting being configured to be press fitted into a drainage outlet, wherein the floor drain fitting comprises:
    a housing comprising an upper surface defining a housing inlet, a lower surface defining a housing outlet and a sidewall defining a housing throughbore, wherein the sidewall includes an external surface profile; and
    a radially extending lip extending from the upper surface, wherein the external surface profile is configured to receive and engage with a complementary internal surface profile of a seal, wherein the internal surface profile of the seal and the external surface profile of the housing include complementary ribs and ridges, where the ribs are received in the ridges to engage the seal and housing for press-fit insertion as a unit into the drainage outlet;
    wherein the seal includes a body and an upper surface, wherein an inner surface of the body includes the internal surface profile and an outer surface of the body includes a plurality of radially extending fins, wherein the upper surface of the seal comprises a recess and a radially extending seal lip, wherein the radially extending seal lip of the housing is received and engaged in the recess and wherein, in use, the radially extending seal lip engages with a floor adjacent to the drainage outlet and the radially extending fins engage with an inner surface of the drainage outlet thereby providing multi-contact sealing with the drainage outlet and an area of floor adjacent to the drainage outlet; and
    a one-way valve adapted to be received within the housing, wherein the one-way valve is configured to allow fluid flow between the housing inlet and the housing outlet and to prevent fluid flow between the housing outlet and the housing inlet in a direction from the housing outlet to the housing inlet.

3. A floor drain fitting, the floor drain fitting being configured to be press-fitted into a drainage outlet, wherein the floor drain fitting comprises:
    a housing comprising an upper surface defining a housing inlet, a lower surface defining a housing outlet, and a sidewall defining a housing throughbore, wherein the sidewall includes an external surface profile and a radially extending lip extending from the upper surface, wherein the external surface profile is configured to receive and engage with a complementary internal surface profile of a seal, wherein an assembly of the housing and the seal is configured to be inserted by a press-fit as a unit into the drainage outlet;
    wherein the seal includes a body and an upper surface, wherein an inner surface of the body includes the internal surface profile and an outer surface of the body includes a plurality of radially extending fins, wherein the upper surface of the seal comprises a recess and a radially extending seal lip, wherein the radially extending seal lip of the housing is received and engaged in the recess and wherein, in use, the radially extending seal lip engages with a floor adjacent to the drainage outlet and the radially extending fins engage with an inner surface of the drainage outlet;
    a one-way duck bill valve adapted to be received within the housing, the one-way duck bill valve having a body defining a valve inlet, a valve outlet and a valve passageway, the passageway providing fluid communication between the housing inlet and the housing outlet and preventing fluid communication between the housing outlet and the housing inlet in a direction from the housing outlet to the housing inlet; and
    a fitting insert located in the housing inlet, the fitting insert defining an insert portion which extends through the valve inlet and into a mouth of the valve passageway;
    wherein in the presence of a negative pressure differential, air can pass through the valve to relieve the pressure differential, but in the event of a positive pressure differential, the insert portion is operable to prevent the one-way duck bill valve from inverting to relieve the pressure differential.

4. The floor drain fitting of claim 3, wherein the seal is adapted to be releaseably attachable to the housing external surface.

5. The floor drain fitting of claim 3, wherein the seal forms an interference fit with the housing.

6. The floor drain fitting of claim 3, wherein the fitting insert is releaseably locatable in the housing inlet.

7. The floor drain fitting of claim 6, wherein the fitting insert is releaseably locatable by means of a push fit, twist fit, screw fit or threadable connection.

8. The floor drain fitting of claim 6, wherein the fitting insert is locatable in the housing inlet by means of a bayonet fitting.

9. The floor drain fitting of claim 3, wherein, once located within the housing inlet, an upper surface of the fitting insert is co-planar with the upper surface of the housing.

10. The floor drain fitting of claim 3, wherein the floor drain fitting further comprises a drain cover.

11. The floor drain fitting of claim 10, wherein at least one of an upper surface of the fitting insert and the upper surface of the housing define lugs adapted to support the drain cover.

12. The floor drain fitting of claim 10, wherein the upper surface of the housing comprises a plurality of castellation configured to support a portion of the drain cover receivable over the floor drain fitting.

13. The floor drain fitting of claim 3, wherein the one-way duck bill valve is sandwiched between the housing and the fitting insert.

14. The floor drain fitting of claim 3, wherein the fitting insert defines a filter.

15. The floor drain fitting of claim 14, wherein the filter extends across an inlet of the fitting insert.

16. The floor drain fitting of claim 14, wherein the filter defines a grill.

17. The floor drain fitting of claim 16, wherein the insert portion downwardly depends from the grill.

18. The floor drain fitting of claim 17, wherein the insert portion extends from the grill through the valve inlet and into the centre of the valve passageway.

19. The floor drain fitting of claim 3 wherein, in use, the upper surface of the housing, the upper surface of the seal and an upper surface of the fitting insert are substantially co-planar.

20. The floor drain fitting of claim 3, wherein the radially extending seal lip is operable to create a contact seal with the floor adjacent to the drainage outlet in which the floor drain fitting is inserted.

21. The floor drain fitting of claim 3, wherein the internal surface profile of the seal and the external surface profile of the housing include complementary ribs and ridges, where the ribs are received in the ridges to engage the seal and housing for insertion as a unit into the drainage outlet.

* * * * *

UNITED STATES PATENT AND TRADEMARK OFFICE
CERTIFICATE OF CORRECTION

PATENT NO. : 10,030,374 B2
APPLICATION NO. : 14/892806
DATED : July 24, 2018
INVENTOR(S) : James Edward McAlpine It is certified that error appears in the above-identified patent and that said Letters Patent is hereby corrected as shown below:

In the Specification

Column 5, Lines 35-36 read "the seal radially extending lip" should read --the radially extending seal lip--

Signed and Sealed this
Twenty-eighth Day of August, 2018

Andrei Iancu
*Director of the United States Patent and Trademark Office*